(12) United States Patent
Wesselink

(10) Patent No.: US 7,400,054 B2
(45) Date of Patent: Jul. 15, 2008

(54) METHOD AND ASSEMBLY FOR DETECTING BLADE STATUS IN A WIND TURBINE

(75) Inventor: Jean-Louis Wesselink, Almelo (NL)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 11/328,254

(22) Filed: Jan. 10, 2006

(65) Prior Publication Data

US 2007/0159346 A1 Jul. 12, 2007

(51) Int. Cl.
F03D 9/00 (2006.01)

(52) U.S. Cl. .................. 290/44; 290/55; 340/572.1; 416/1; 416/61

(58) Field of Classification Search .......... 340/572.1; 416/61, 146; 290/44
See application file for complete search history.

(56) References Cited

U.S. PATENT DOCUMENTS

| 4,155,252 | A | 5/1979 | Morrill | |
|---|---|---|---|---|
| 4,834,610 | A | 5/1989 | Bond, III | |
| 5,140,856 | A | 8/1992 | Larsen | |
| 5,857,694 | A | 1/1999 | Lazarus et al. | |
| 5,961,080 | A | 10/1999 | Sinha | |
| 6,127,739 | A | 10/2000 | Appa | |
| 6,465,901 | B2 | 10/2002 | Croes | |
| 6,465,902 | B1 | 10/2002 | Beauchamp et al. | |
| 6,769,873 | B2 | 8/2004 | Beauchamp et al. | |
| 6,809,516 | B1 | 10/2004 | Li | |
| 6,888,262 | B2 | 5/2005 | Blakemore | |
| 6,940,186 | B2 * | 9/2005 | Weitkamp | 290/44 |
| 7,086,834 | B2 * | 8/2006 | LeMieux | 416/1 |
| 7,176,812 | B1 * | 2/2007 | Kelley | 340/946 |
| 2004/0057828 | A1 * | 3/2004 | Bosche | 416/1 |
| 2004/0152544 | A1 | 8/2004 | Lammer | |
| 2007/0098551 | A1 * | 5/2007 | Viertl | 416/61 |
| 2007/0108770 | A1 * | 5/2007 | Riesberg | 290/44 |
| 2007/0131781 | A1 * | 6/2007 | Roth et al. | 235/492 |
| 2007/0256788 | A1 * | 11/2007 | Ford et al. | 156/358 |

FOREIGN PATENT DOCUMENTS

WO 2004/111686 12/2004

OTHER PUBLICATIONS

U.S. Appl. No. 11/295,467, filed Dec. 7, 2005.

* cited by examiner

*Primary Examiner*—Jeff Hofsass
*Assistant Examiner*—Jack Wang
(74) *Attorney, Agent, or Firm*—Nixon & Vanderhye PC

(57) ABSTRACT

Transponder technology is incorporated into the blades of a wind turbine to make it possible to transfer data wirelessly from each said blade to the associated tower. By providing a transponder including an RFID device in or on each of the blades and providing a reader/receiver in or on the tower support of the wind turbine, the reader/receiver can detect the operative RFID devices and/or read data from the RFID devices as the blades pass the tower.

13 Claims, 2 Drawing Sheets

METHOD AND ASSEMBLY FOR DETECTING BLADE STATUS IN A WIND TURBINE

BACKGROUND OF THE INVENTION

For centuries, windmills have been used for pumping water and grinding grain. More recently, so called wind turbines have been used to generate electric power from intercepted wind power. A basic problem in harnessing power from wind is the low density of power per unit volume handle. The maximum amount of power that may be extracted from the wind is proportional to the circular cross-sectional area through which the blades rotate, multiplied by the square of wind velocity. More specifically, the extractable power is the total kinetic energy of the air moving through the turbine's cross-section per unit time. Of this available power, however, the actual turbine will only extract a fraction, thereby defining the turbine's efficiency.

BRIEF DESCRIPTION OF THE INVENTION

Since physical contact between the air and the turbine blades is necessary to transfer the wind power, the blades must either have an aggregate area equal to a large fraction of their circular cross-section or they must rotate rapidly to be able to interact with most of the air flowing therethrough. When the blade of a wind turbine is damaged such as by a lightning strike, by being bent so as to be deformed or the like, the turbine's efficiency may be decreased because the blades shape or orientation with respect to the wind is no longer optimal so as to increase drag or reduce the wind intercepting area relative to its design.

Because turbines mounted close to the earth pose a danger to humans and animals and are not placed in optimum wind intercepting conditions, wind turbines are typically mounted to towers so that they are disposed high above the ground. This makes inspection and maintenance very difficult so it would be desirable to determine remotely the potential for blade damage so that maintenance can be timely undertaken or prioritized. Further, it would be desirable to detect potential blade damage without the input of additional energy as that would reduce the overall efficiency of the turbine.

The invention proposes to integrate transponder technology into the blades of a wind turbine to make it possible to transfer data wirelessly from each said blade to the associated tower without any requirement for power input to the transponder disposed in the blade.

Thus, the invention may be embodied in a method of accurately determining a condition of a blade of a wind turbine that includes a plurality of blades mounted to a rotor shaft of a turbine assembly supported atop a tower support, comprising: a) securing a transponder including an RFID device to each of said blades; b) providing a reader/receiver on or in the tower support; and c) selectively at least one of i) detecting operative said RFID devices and/or ii) reading data from said RFID devices with said reader/receiver as said blades pass said tower.

The invention may also be embodied in a wind turbine comprising: a plurality of blades mounted to a rotor shaft of a turbine assembly supported atop a tower support; a transponder including an RFID device secured to each of said blades; a reader/receiver provided on or in the tower support for selectively detecting said RFID devices as said blades pass said tower.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawing, in which.

DETAILED DESCRIPTION OF THE INVENTION

Radio frequency identification tagging is a known method of identification in certain arts. In particular, a reader of a conventional RFID system produces and emits an electromagnetic interrogation field at a specific frequency when excited by connected electronic drive circuitry. The RFID tag or device typically includes a semiconductor chip having RF circuits, logic, and memory, as well as an antenna. The device functions in response to the coded radio frequency (RF) signal. If the device is positioned within the interrogation field for a sufficient time, the RFID inlay will become stimulated and transmit a uniquely coded signal that is received by the reader or a separate receiving antenna. The RF carrier signal is demodulated to recover information stored in the RFID device. Various RFID structures, circuits, and programming protocols are known in the art. Examples are described in U.S. Pat. No. 5,682,143 (Brady et al.) and U.S. Pat. No. 5,444,223 (Blama), both of which are incorporated herein by reference.

Although RFID devices or tags are not yet as prevalent as other identification means, RFID devices are gaining in popularity in various applications. These include railway boxcar and tractor trailer identification schemes, fare cards for buses and subways, animal identification, employee and security badges, and in automatic highway toll systems. In an automatic highway toll system, for example EZ Pass, drivers mount an RFID device on the front vehicle windshield. The RFID device is preprogrammed with driver information, such as account status, vehicle information, etc. As the vehicle passes through a toll, a base transmitter at the tollbooth emits a signal which is reflected by the RFID device. If the driver's account is satisfactory, a green light activates; indicating the driver is free to pass through the toll.

Electronic (RFID) devices are commercially available and do not per se embody the invention. Early RFID systems were developed utilizing relatively large packages, which limited the products on which they could be used. More recently, RFID devices have been made smaller so that they may be readily incorporated in tags or labels and their use can be more widespread. Such electronic devices are characterized in that they are thin, flat and generally flexible devices that are desirably laminated between outer sheets or layers of the label so that the electronic feature is protected from the ambient environment, more specifically, moisture and/or heat exposure as may be encountered by the components to which they are applied.

The invention proposes to integrate RFID transponder technology into the blades of a wind turbine to make it possible to transfer data wirelessly from each said blade to the associated tower without any requirement for power input to the transponder disposed in the blade.

Figure 1:
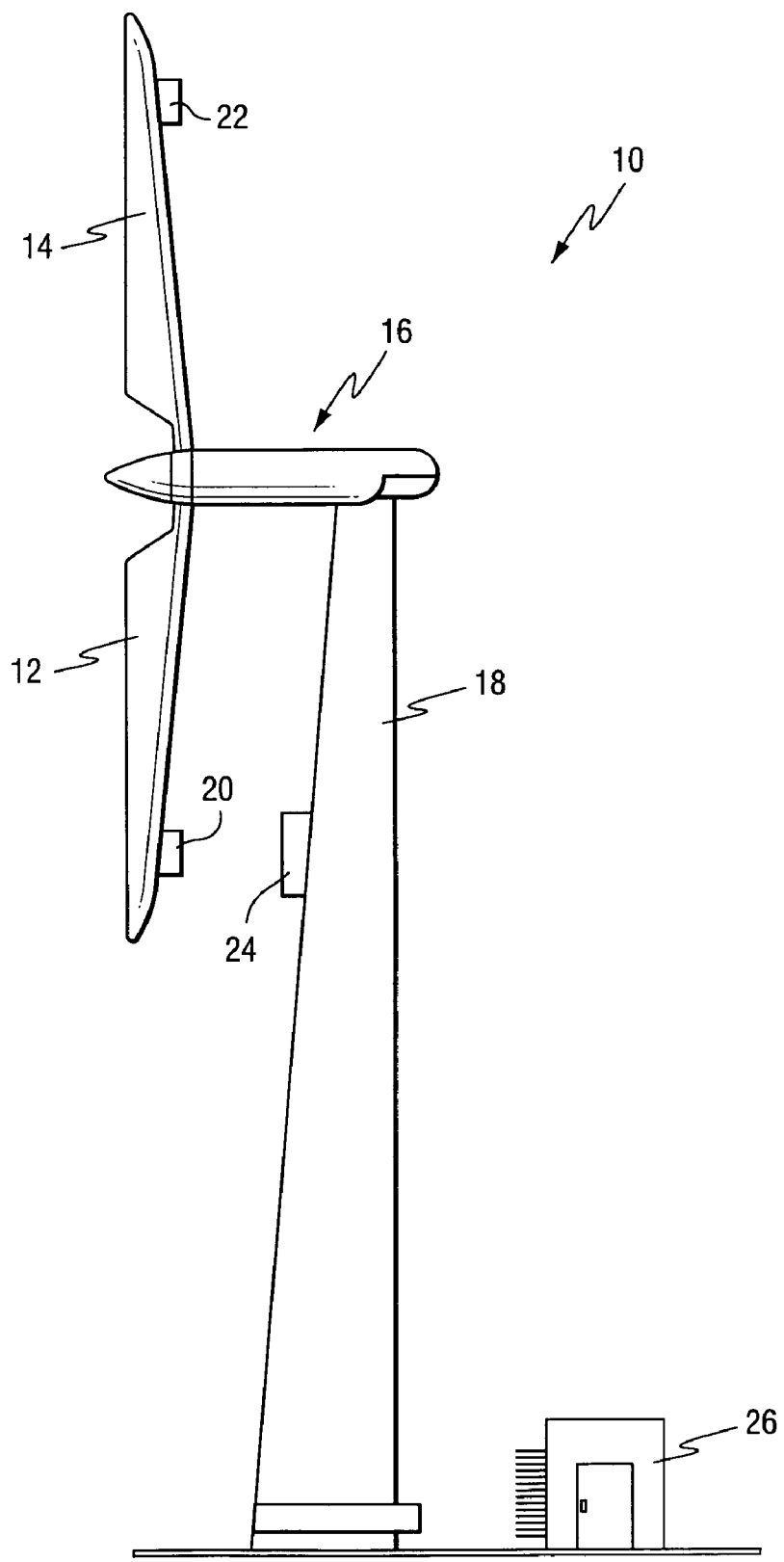
FIG. 1 schematically illustrates a wind turbine assembly incorporating a transponder and receiver/reader according to an example embodiment of the invention.
Figure 2:
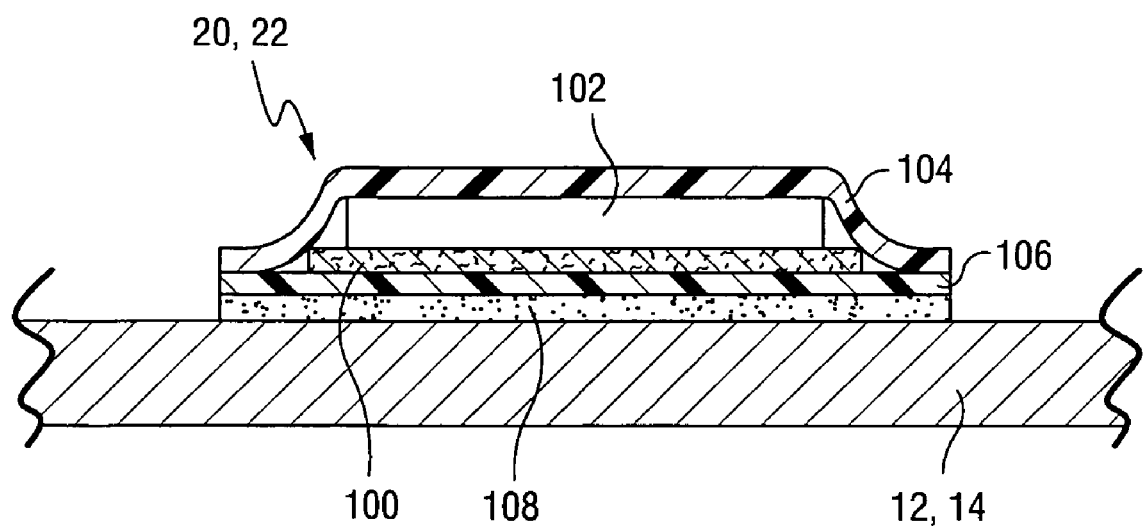
FIG. 2 is a schematic illustration of a tag incorporating an RFID device secured to a wind turbine blade.

FIG. 1 schematically illustrates by way of example a wind turbine 10 comprised of a plurality of blades 12, 14 mounted to a rotor shaft of a turbine assembly 16 supported atop a tower 18 in a conventional manner. According to an example embodiment of the invention, a transponder 20, 22, e.g., an RFID device, is embedded in each of the blades of the wind turbine or incorporated in RFID tags secured respectively to, e.g., the leeward surface of each blade 12, 14. In the latter case, as mentioned above, the RFID devices that are desirably laminated between outer sheets or layers so that the electronic feature is protected from the ambient environment, more specifically moisture and/or heat exposure, as may be encountered by the wind turbine blades to which they are applied. Thus, the RFID device may be operatively associated with each wind turbine blade by applying a permanent adhesive label with an imbedded or mounted RFID device thereto. In one example embodiment, schematically illustrated in FIG. 2, this can be achieved by using a substantially moisture impermeable label, more specifically, paper stock 100 mounting an RFID chip 102 laminated between two pieces of plastic film 104, 106, one which has permanent adhesive 108 on an exterior surface thereof. Advantageously, human readable indicia are included on the label surface or on the paper stock so as to be visible from the exterior of the blade. This allows information about the RFID device and/or about its installation to be discerned, even if the device has been rendered inoperable, as discussed in greater detail below.

A reader/receiver 24 of the RFID system is suitably provided e.g. on the associated tower 18 of the wind turbine 10 and produces and emits an electromagnetic interrogation field as described above. Preferably, each of the transponders 20, 22 uniquely identifies the associated blade 12, 14 so that the reader/receiver disposed on the tower structure detects, and records as deemed necessary or desirable, each respective transponder as it passes.

In one example embodiment, the transponder incorporated in the blade is disabled or destroyed as a consequence of a lightning strike so that it will no longer be operative. Any inoperative transponder (RFID device) will not be detected by the receiver as the blade or blade remnant passes the tower. Thus, the absence of a signal from the respective transponder, or detecting sequential transponder signals from the next adjacent blade(s), is an indication to the associated control system 26 that the blade has been damaged and can suitably trigger an error or defect signal. Thus, it can be recorded which blade or blades may be damaged, and the time of the damage, for scheduling maintenance, turbine shut down or other appropriate response.

Some radio frequency transponders are simply configured to indicate when a particular object bearing the radio frequency identification device (RFID device) passes a detection region of a receiver. Other RFID devices are preprogrammed with non-variable information that can be read by the reader/receiver and provides additional information, e.g. identifying the object, not simply it's presence. Still other RFID's are adapted to include certain read-only (pre-programmed) information and certain rewritable information and/or can have (variable) information selectively inputted thereto. Thus, an RFID device provided on the blade of a turbine may be configured to be selectively disabled by a lightning strike, as mentioned above, or more complex electronics may be provided to detect and record sequential lightning strikes, to provide a record of the number of lightning strikes that a particular blade has received, which may also be an indication of blade damage. Thus, the RFID device can be selectively programmed with this variable blade damage information and the reader/receiver can read the programmed variable information. Periodically, that is after the variable information is read, the RFID device is preferably reprogrammed with other variable information. The re-programming may be effected remotely from the tower, or on-board the respective blade.

The receiver disposed on or in the tower may thus be provided to simply detect the presence of operative RFID devices or may further include a reader to download information wirelessly from the transponder, such as including a number of lightning strikes recorded by the RFID device(s).

By detecting the location of a lightning strike as impacting a particular blade and by securing additional information such as a number of lightning strikes, maintenance can be planned more efficiently, even in the case where the turbine operator does not want to take action immediately, as the information can be provided to the next maintenance team whereby they can visually check for damage and report, and/or provide replacement blade and/or transponder.

In accordance with another alternate embodiment, the transponder can be further associated with further passive electronics to establish if a blade has been bent greater than a prescribed amount. For example, the more complex electronics are adapted or may be configured to cease functioning as soon as a particular mechanical level has been crossed. In this case again, failure of the transponder to function will be detected by a corresponding receiver in the tower and communicated to control. In the alternative, strain gauges and/or piezoelectric fibers and the like, and associated circuits, described in co-pending application Ser. No. 11/295,467, filed Dec. 7, 2005 (known as GE Disclosure No. 189907; the entire disclosure of which is incorporated herein by this reference) may be incorporated at several locations to supply information to the transponder for being read by the receiver for safety control, proactive maintenance, and/or to indicate changes in mechanical properties of each individual blade during its lifetime.

In yet a further example, the transponder can be associated with further, more complex passive electronics to establish if a certain noise value has been exceeded, or a predetermined vibration level is exceed. For example, the further passive electronics may be adapted or configured to cease or modify operation of the transponder as soon as a threshold noise level or threshold vibration level has been exceeded, this failure or modification being detected by the receiver.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of monitoring a blade of a wind turbine that includes a plurality of blades mounted to a rotor shaft of a turbine assembly supported atop a tower support, comprising:
   a) securing a transponder including an RFID device to each of said blades;
   b) providing a reader/receiver on or in the tower support; and
   c) selectively at least one of i) detecting operative said RFID devices and/or ii) reading data from said RFID devices with said reader/receiver as said blades pass said tower,
   wherein (a) is practiced by applying a permanent adhesive label with an imbedded or mounted RFID device to said blades.

2. A method as in claim 1, wherein (a) is practiced by using a substantially moisture impermeable label, and including human readable indicia on the label that is visible with thereon visible from the exterior of the blade.

3. A method as in claim 2 wherein (a) is practiced using paper stock mounting an RFID chip laminated between two pieces of plastic film, one piece of plastic film having permanent adhesive on an exterior surface thereof.

4. A method as in claim 1, further comprising,
d) selectively programming at least one said RFID device with variable information and wherein said reading data with said reader/receiver comprises reading the programmed variable information of the at least one RFID device.

5. A method as in claim 4, further comprising, after said reading said variable information, e) reprogramming said at least one said RFID device with other variable information.

6. A method as in claim 5, wherein the RFID device is further preprogrammed with non-variable information which is not affected by subsequent programming and reprogramming pursuant to (d) and (e).

7. A method as in claim 1, wherein the transponder is constructed and arranged so that a lightning strike disables said transponder so that the RFID device cannot be detected or read by the reader/receiver.

8. A wind turbine comprising:
a plurality of blades mounted to a rotor shaft of a turbine assembly supported atop a tower support;
a transponder including an RFID device secured to each of said blades;
a reader/receiver provided on or in the tower support for selectively detecting said RFID devices as said blades pass said tower,
wherein said transponders comprise RFID tags with an embedded or mounted RFID device, said RFID tags being adhesively secured respectively to the leeward surface of each blade.

9. A wind turbine as in claim 8, wherein said receiver produces and emits an electromagnetic interrogation field.

10. A wind turbine as in claim 8, wherein said transponders uniquely identify the associated blade so that the reader/receiver disposed on the tower structure detects each respective transponder as it passes.

11. A wind turbine as in claim 8, wherein said RFID devices are laminated between outer sheets or layers so as to be protected from the ambient environment.

12. A wind turbine as in claim 11, wherein said outer sheets or layers are substantially moisture impermeable and include human readable indicia that is visible thereon visible from the exterior of the blade.

13. A wind turbine as in claim 11, wherein each RFID tag comprises an RFID chip laminated between two pieces of plastic film, one piece of plastic film having permanent adhesive on an exterior surface thereof.

* * * * *